United States Patent
Krokoszinski et al.

(10) Patent No.: US 6,933,639 B2
(45) Date of Patent: Aug. 23, 2005

(54) METHOD AND CONFIGURATION FOR DRIVING A THRUST BODY BY A BIDIRECTIONAL LINEAR SOLENOID DRIVE

(75) Inventors: Hans-Joachim Krokoszinski, Nussloch (DE); Andreas Kahnert, Ober-Ramstadt (DE); Wolfgang Waldi, Nussloch (DE); Rolf Disselnkötter, Mauer (DE)

(73) Assignee: Vecto Gray Controls Limited, Bristol (GB)

( * ) Notice: Subject to any disclaimer, the term of this patent is extended or adjusted under 35 U.S.C. 154(b) by 0 days.

(21) Appl. No.: 10/895,194

(22) Filed: Jul. 19, 2004

(65) Prior Publication Data

US 2004/0263004 A1 Dec. 30, 2004

Related U.S. Application Data

(63) Continuation of application No. PCT/EP02/00471, filed on Jan. 18, 2002.

(51) Int. Cl.$^7$ .............................................. H02K 41/00
(52) U.S. Cl. .......................................... 310/80; 310/12
(58) Field of Search .............................. 310/12–14, 20, 310/80

(56) References Cited

U.S. PATENT DOCUMENTS

| | | | | |
|---|---|---|---|---|
| 4,607,197 A | * | 8/1986 | Conrad ...................... | 318/116 |
| 4,796,708 A | | 1/1989 | Lembcke .................... | 166/66.7 |
| 5,600,189 A | | 2/1997 | Van Geel et al. ......... | 310/40 R |
| 6,137,195 A | | 10/2000 | Chitayat ...................... | 310/12 |

FOREIGN PATENT DOCUMENTS

| | | | |
|---|---|---|---|
| DE | 2 145 073 | 3/1972 | ............. H01F/7/16 |
| DE | 690 21 713 T2 | 8/1991 | ............ B65G/21/18 |
| DE | 41 22 769 C2 | 1/1993 | ............. G05D/3/20 |
| DE | 198 53 324 A1 | 10/1999 | ......... H02K/41/03 |
| DE | 199 12 136 A1 | 9/2000 | ......... H02K/41/02 |
| EP | 0 442 200 B1 | 8/1991 | ............ B65G/21/18 |
| EP | 0 482 321 A1 | 4/1992 | ......... H02K/41/03 |
| EP | 0 984 133 A1 | 3/2000 | ......... E21B/33/035 |

OTHER PUBLICATIONS

Klingauf, U.: "Untersuchung der Systemdynamik eines fehlertoleranten elektrohydraulischen Stellantriebs mit Direct–Drive–Ventil (DDV)" [Investigation of the System Dynamic of a Fault Tolerant Electro Hydraulic Control with Direct–Drive–Valve (DDV)], VDI Verlag, vol. 8, No. 547, Jul. 7, 1995, pp. 1–2 and 14–15.

* cited by examiner

Primary Examiner—Darren Schuberg
Assistant Examiner—Judson H. Jones
(74) Attorney, Agent, or Firm—Laurence A. Greenberg; Werner H. Stemer; Ralph E. Locher

(57) ABSTRACT

A method for driving a thrust body with a bidirectional linear solenoid drive having at least in each case one first actuator and one second actuator includes the steps of providing the at least one first actuator with at least one coil and a yoke and applying force alternately to the thrust body by interacting the first actuator with at least one armature ring. The armature ring is rotated with the second actuator to thereby axially shift the thrust body by the rotation of the armature ring. The thrust body is, then, shifted axially and is subsequently fixed in position with the thrust body being shifted in steps in this way until it has reached its respective final position. Also provided is a configuration for carrying out the method.

48 Claims, 7 Drawing Sheets

Schnitt A - A

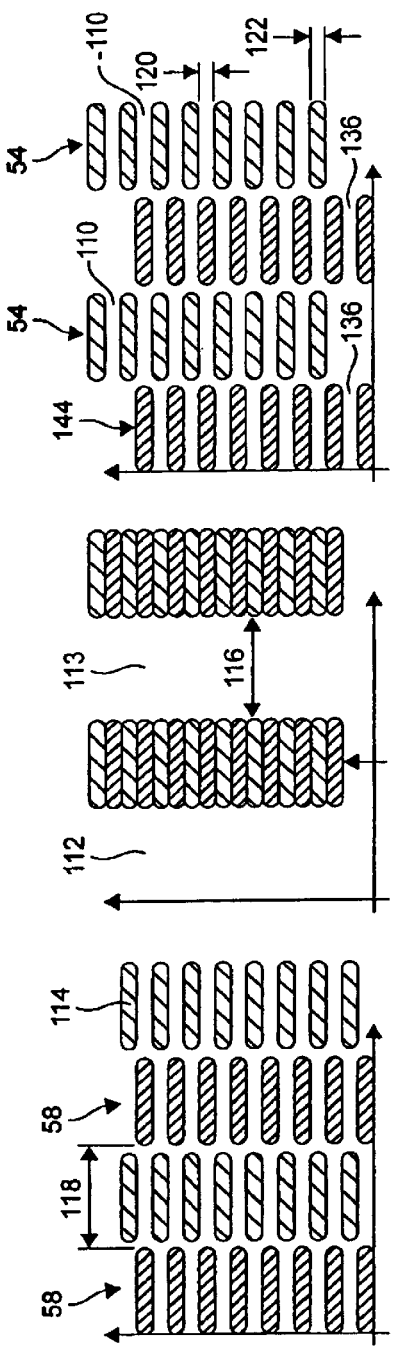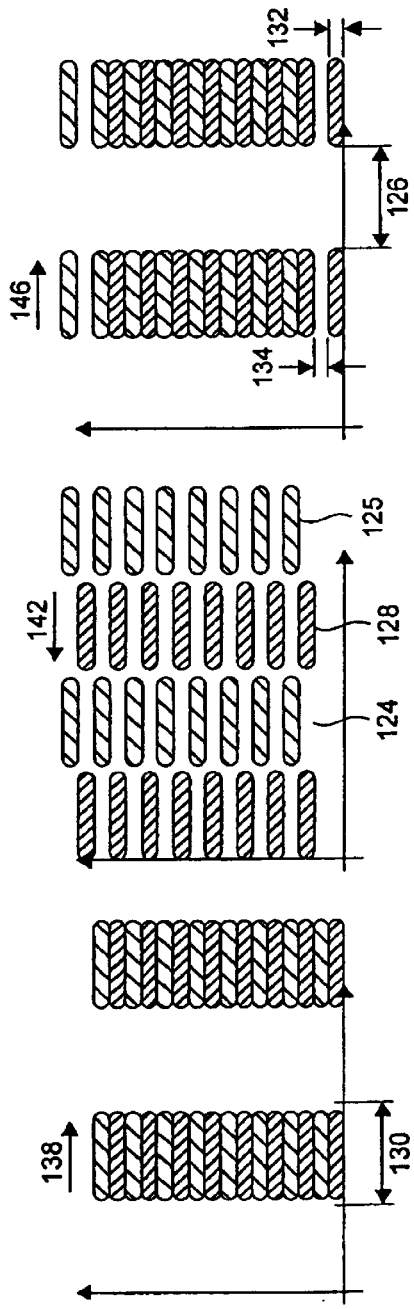

METHOD AND CONFIGURATION FOR DRIVING A THRUST BODY BY A BIDIRECTIONAL LINEAR SOLENOID DRIVE

CROSS-REFERENCE TO RELATED APPLICATION

This application is a continuation, under 35 U.S.C. § 120, of copending international application No. PCT/EP02/00471, filed Jan. 18, 2002, which designated the United States.

BACKGROUND OF THE INVENTION

Field of the Invention

The invention relates to a method for driving a thrust body by a bidirectional linear solenoid drive, and to a configuration for carrying out the method according to the invention.

In the case of very deep holes, for example, oil boreholes, the components and systems that are used are subject to particular requirements: temperatures of up to 225° C., pressures up to 700 bar, and corrosive atmospheres results in extreme design conditions for the technology that is used. The space available for a component is determined by the production tube or feed tube and, thus, limits the options for the construction of these components.

Restrictor valves, for example, in holes such as these are nowadays, therefore, generally driven by hydraulic systems. These can apply the high required actuating forces of about 25,000 N and can carry out the actuating movement, which is typically 200 mm. It is difficult to supply compressed fluid, particularly in the case of multilateral holes with branches into side arms. Long oil supply lines for these hydraulics have to withstand temperature differences: for example, typical temperature values of 200° C. in a deep borehole, 4° C. at the seabed, and −20° C. at the feed point or feed platform. These temperature differences cause non-uniform material expansion, which frequently results in malfunctions.

A conventional actuating drive for such a restrictor valve typically has no more than five positions, that is to say, closed, a quarter open, half open, three quarters open, and open so that only correspondingly coarse control is achieved. Furthermore, for applications such as these, the required life is, frequently, at least ten years, with high reliability.

If electrical drives are used to improve the controllability in this case, for example, stepping motors, then the required drive force can be applied only through a transmission system due to the shortage of space available in the boreholes. The number of components, in particular, the number of moving parts of such a drive system has a negative effect, however, on the reliability of these alternative drives.

The VDI Progress Reports, Series 8, No. 547 "Untersuchung der Systemdynamik eines fehlertoleranten elektrohydraulischen Stellantriebs mit Direct-Drive-Ventil" [Investigation into the system dynamics of a fault-tolerant electro-hydraulic actuating drive with a direct-drive valve] by Dipl.-Ing. Uwe Klingauf, Taufkirchen, disclose an electromagnetic drive for aircraft construction, which can apply a high drive force, but whose travel is restricted to about 0.8 mm. The drive transmits the force to a shaft that is, correspondingly, deflected through about 0.8 mm. The deflection acts through a main control valve on a hydraulic power stage, which, in the end, is the actuating element of the control system.

SUMMARY OF THE INVENTION

It is accordingly an object of the invention to provide a method and configuration for driving a thrust body by a bidirectional linear solenoid drive that overcomes the hereinafore-mentioned disadvantages of the heretofore-known devices and methods of this general type and that drives a thrust body without any procedural restriction to the thrust movement and, in the process, produces high thrust forces, for example, as is required to adjust a valve in deep boreholes for feeding oil. Also provided is a configuration for carrying out the method according to the invention that operates with high reliability over a long life and has a simple and robust design.

With the foregoing and other objects in view, there is provided, in accordance with the invention, a method for driving a thrust body, including the steps of providing a bidirectional linear solenoid drive with at least one first actuator and one second actuator, providing the first actuator with at least one solenoid and a yoke, and shifting the thrust body in steps until the thrust body has reached a respective final position by applying force alternately to the thrust body by interacting the first actuator with at least one armature ring and rotating the armature ring with the second actuator to thereby axially shift the thrust body by the rotation of the armature ring and subsequently fix the thrust body in position.

Accordingly, the invention proposes that the method for driving a thrust body be carried out by a bidirectional linear solenoid drive having at least in each case one first and one second actuator, with the at least one first actuator being provided with at least one coil and a yoke and interacting with at least one armature ring that applies force alternately to the thrust body. The thrust body is, then, shifted axially by the at least one armature ring, which is rotated by the at least one second actuator acting on it, and is subsequently fixed in position, with the thrust body being shifted in steps in this way until it has reached its respective final position.

In accordance with another mode of the invention, the drive power is, advantageously, supplied electrically and is free of the normal mechanical risks of power—transmitting lines for a hydraulic system. The invention makes it possible to move a thrust body in any desired number of individual steps with lengths, for example, of 1 mm or 2 mm. This allows a drive system with an accuracy corresponding to the step length of an individual step, for example, for a valve, when the thrust body is used as an actuating element for the valve. Furthermore, this allows a specific flow rate through a pipeline to be set in a particularly simple manner in that the thrust body produces a correspondingly exact, predetermined valve position.

The bidirectional linear solenoid drive is, then, operated as a drive for a flow control valve.

In accordance with a further mode of the invention, the armature ring or the at least one second actuator interacting with a latching apparatus such that the thrust body is fixed in position by the latching apparatus at least when the armature ring is not acting on the thrust body.

Such a refinement results in a particularly simple drive and simple coordination of the process steps by the latching apparatus and the armature ring or the at least one second actuator.

In accordance with an added mode of the invention, the method is, advantageously, simplified if the latching apparatus carries out at least one rotary movement in order to fix the thrust body in position at times. This means that the latching apparatus and the at least one armature ring substantially carry out only rotary movements about the longitudinal axis. However, the latching apparatus may also be moved by at least one third actuator and can, then, advantageously be driven autonomously.

In accordance with an additional mode of the invention, the thrust body is to be acted on in an interlocking manner by the at least one first actuator. This, therefore, allows the axial force to be transmitted between the at least one armature ring and the thrust body in a simple manner.

In accordance with yet another mode of the invention the at least one armature ring interacts with the thrust body in that the at least one armature ring is rotated in one rotation direction about the longitudinal axis and the latching apparatus causes latching, which, in each case, fixes the thrust body in position until the at least one first actuator once again acts on the thrust body.

The at least one second actuator must drive the at least one armature ring in only one rotation direction.

In accordance with yet a further mode of the invention, the at least one armature ring interacts with the thrust body in that the at least one armature ring is rotated alternately in the rotation directions about the longitudinal axis, and for the latching apparatus to cause latching, which, in each case, fixes the thrust body in position until the at least one first actuator acts on the thrust body once again.

In such a case, one refinement of the method provides for the armature ring to rotate, in the event of any rotary movement, in the opposite direction to its direction of rotation in the previous movement step.

However, it is also feasible for two or more movement steps first of all to be carried out in one rotation direction, after which two or more movement steps are carried out in the opposite rotation direction. Furthermore, there are, advantageously, no fundamental restrictions relating to the number of movement steps in one rotation direction or the other having to be of equal magnitude.

The method can be ended in a simple manner when a specific switching-on criterion is reached.

By way of example, the method is ended on reaching a specific number of movement steps after the start of the method. The overall distance traveled by the thrust body can be determined in a simple manner from the number of movement steps and from the individual movement distances associated with the movement steps.

A further possible way to end the method is to use a signal for switching-off purposes. Such a signal is, advantageously, generated in a simple manner, for example, by a limit switch when the thrust body reaches a specific position.

Another alternative signal that is useful for switching-off purposes may be a signal corresponding to an appropriate distance measurement.

With the objects of the invention in view, there is also provided a driving configuration, including a thrust body, a bidirectional linear solenoid drive for driving the thrust body in steps until the thrust body has reached a respective final position, the solenoid drive having at least one first actuator and at least one second actuator, the first actuator having at least one yoke, at least one solenoid, and at least one armature ring, the first actuator configured to substantially axially move the thrust body, the yoke and the armature ring being separated at a distance from one another to define therebetween an active air gap, the armature ring configured to operatively interact with the thrust body and, thereby, apply force alternately to the thrust body, the second actuator operatively connected to the armature ring to rotate the armature ring and, thereby, axially shift the thrust body and subsequently fix the thrust body in position, and a latching apparatus configured to fix the thrust body at times.

With the objects of the invention in view, there is also provided a driving configuration, including a thrust body, a bidirectional linear solenoid drive for driving the thrust body according to the method of claim 1, the solenoid drive having at least one first actuator and at least one second actuator, the first actuator having at least one yoke, at least one solenoid, and at least one armature ring, the first actuator configured to substantially axially move the thrust body, the yoke and the armature ring being separated at a distance from one another to define therebetween an active air gap, the armature ring configured to operatively interact with the thrust body, the second actuator operatively connected to the armature ring to rotate the armature ring, and a latching apparatus configured to fix the thrust body at times.

According to the invention, a configuration for carrying out the method according to the invention for driving a thrust body by a bidirectional linear solenoid drive is proposed, in which configuration the bidirectional linear solenoid drive has at least in each case one first actuator and one second actuator. The at least one first actuator has at least one yoke, at least one coil, and at least one armature ring and is provided for substantially axial movement of the thrust body. The distance between the at least one yoke and the at least one armature ring is in the form of an active air gap, with the at least one armature ring being provided for interaction with the thrust body. The at least second actuator is provided at least for rotation of the at least one armature ring, and a latching apparatus is provided to fix the thrust body at times.

The drive energy that is required is provided by an electrical drive with a small number of moving components. This means that the configuration according to the invention operates with little maintenance, robustly and with high reliability, and with correspondingly little susceptibility to malfunctions when changes occur in the environmental conditions.

In accordance with yet an added feature of the invention, the first actuator has at least two permanent magnets and the permanent magnets magnetically act upon the armature ring to magnetically clamp the armature ring in an unstable manner.

In accordance with yet an additional feature of the invention, the surface of the thrust body is to be provided with a holding structure at least in places in the area of the surface facing the at least one armature ring to be provided on the surface facing the thrust body with a mating structure that is compatible with the holding structure and is inserted into the holding structure during rotation about the longitudinal axis of the armature ring.

It is particularly advantageous for the thrust body to have an outline in the form of a cylinder, a plunger, an annulus, and a tube. In particular, the outline is a cylindrical outline. Such an outline assists the rotary movements and simplifies the construction of the armature ring and of its connection to the thrust body.

A tubular outline is also advantageous for the thrust body because this shape is required particularly frequently in boreholes for conveying raw materials. In such a case, an outer production tube together with a transport tube that is guided therein forms an annular space in which the components that are required in the borehole are accommodated. It is, thus, advantageous for the thrust body to be tubular.

In accordance with again another feature of the invention, the holding structure has first recesses parallel to the axis. The mating structure can move axially in these first recesses. These first recesses are, advantageously, often in the form of grooves or slots, for manufacturing reasons.

In addition, the holding structure has second recesses in the axial direction, for example, once again in the form of grooves or slots. The mating structure engages in the second recesses as a result of rotary movement. When a movement step takes place, the entire drive power of the bidirectional linear solenoid drive is transmitted through the mating structure into the holding structure onto the thrust body, or vice-versa.

In accordance with again a further feature of the invention, the holding structure has substantially helical recesses and the substantially helical recesses permit a combined axial/radial movement of the armature ring. In particular, the first and/or second recesses are grooves, slots, or threads. Further, the substantially helical recesses are grooves, slots, or threads.

In accordance with again an added feature of the invention, the holding structure and the mating structure are, according to the invention, subject to particular mechanical loads and must be configured accordingly, possibly using different materials to the holding structure or the mating structure.

It is has been found to be advantageous for the mating structure and the holding structure to be composed of stainless steel.

In accordance with again an additional feature of the invention, the recesses are one of radially and helically provided on the thrust body and the mating structure is matched to the holding structure to engage in the recesses in the holding structure by a substantially radial movement of the mating structure and/or the holding structure.

In accordance with still another feature of the invention, the mating structure is configured with one of recesses and grooves running parallel to the longitudinal axis to allow the mating structure to move substantially parallel to the thrust body axis in the holding structure.

Stainless steel is only slightly magnetic and is, thus, not suitable as a material for the at least one armature ring. A mating structure that is produced from stainless steel is, according to the invention, firmly connected to the at least one armature ring.

The advantages of the magnetic material and the advantageous mechanical characteristics of stainless steel are, then, combined with one another for this refinement of the at least one armature ring. It is particularly advantageous to use a nut or a reversing nut as the mating structure.

The mating structure may, however, also be integrally formed on the at least one armature ring.

In accordance with still a further feature of the invention, the holding structure and the mating structure are provided radially between the armature ring and the thrust body.

In accordance with still an added feature of the invention, the holding structure and the mating structure are at least partially provided away from a section of the longitudinal axis of the armature ring.

The location of the point at which the holding structure and the mating structure engage with one another is only of secondary importance according to the invention. Depending on given spatial conditions, for example, this point may be provided at least partially away from the section of the longitudinal axis on which the at least one armature ring is provided.

Because the requirements mean that particularly high drive forces have to be applied, the number of first actuators can, advantageously, be increased. The armature rings are, then, disposed such that they jointly transmit forces to the thrust body, or absorb forces from it. There is, therefore, no need to change the type of first actuator. This, advantageously, takes account of the availability of only a restricted space or annular space for the drive. All that is necessary is to match the number of first actuators to the drive requirement. This, advantageously, means that there is no restriction to the maximum thrust force produced by the first actuators.

This also allows redundancies to be completed in a particularly simple manner.

If, for example, for safety reasons, mechanical redundancy is required, the number of first actuators required is, first of all, simply chosen. Redundancy is, accordingly, provided if the chosen number of first actuators is chosen to be at least one greater than is necessary by virtue of the design. The redundancy is increased in a corresponding manner if the number of first actuators is increased further.

In accordance with still an additional feature of the invention, the first actuator is at least two first actuators each having an armature ring and being disposed to one of jointly transmit forces to the thrust body and absorb forces from the thrust body.

If electrical redundancy is required, the number of first actuators must, likewise, be increased above the number required by virtue of the design, and this can easily be done in the same way.

In accordance with another feature of the invention, mechanical and electrical redundancy can, advantageously, be achieved easily by the same procedure as for the first actuators for the second actuators for the radial drive for the components, as well.

In accordance with a further feature of the invention, the solenoid drive, the second actuator, the thrust body, and the latching apparatus are to be disposed in an annular space between an outer tube and an inner tube.

In accordance with an added feature of the invention, the latching apparatus is mechanically coupled to the rotary movement of the at least one armature ring. The coupling is provided, for example, mechanically to at least one armature ring or to the at least one second actuator. The latching apparatus follows rotary movements of the armature ring or second actuator in a corresponding manner or utilizes rotary movement of the armature ring or second actuator as a drive.

When the at least one armature ring then rotates, for example, with the mating structure into the holding structure, the latching apparatus advantageously rotates with it automatically to a position in which the thrust body can move axially. If the mating structure, then, once again rotates out of the holding structure, the latching apparatus likewise moves with it and moves to a different position in which axial movement or resetting of the thrust body is prevented.

A further possibility is to provide a dedicated drive for the latching apparatus by at least one third actuator. This necessarily results in there being at least three actuators or drives, overall.

It is also feasible for all of the actuators to be provided in a redundant form, that is to say, for example, by equipping the latching apparatus with redundant second actuators and by equipping the at least one armature ring with redundant first actuators.

In accordance with an additional feature of the invention, the position of the thrust body can, advantageously, also be visualized by a display. The signals that are produced by such a display are generated by a step counter, a movement sensor, or other signal transmitters, which are suitable for measuring, for determining or for calculating positions.

In accordance with yet another feature of the invention, there is provided at least one step counter measuring individual forward and backward steps of the thrust body and indicating a position of the thrust body from the measurement.

In accordance with yet a further feature of the invention, there is provided a linear movement sensor measuring the thrust body and indicating a position of the thrust body from the measurement.

In accordance with yet an added feature of the invention, there are provided a limit switch operatively connected to the thrust body, a linear movement sensor measuring the thrust body and indicating a position of the thrust body from the measurement, and at least one of the step counter, the linear movement sensor, and the limit switch producing a signal from which axial movement of the thrust body ends.

In accordance with yet an additional feature of the invention, there is provided one or more power supply units for supplying electrical power to electrical load(s).

Because the bidirectional linear solenoid drive is also used, in particular, in extreme environmental conditions, the first, second, and, possibly, the third actuators are, advantageously, configured to be encapsulated in such a situation.

The encapsulation prevents the ingress of dirt or other foreign substances, which could possibly have a negative influence on the operation of the configuration.

If the bidirectional linear solenoid drive is operated in a high environmental pressure in corrosive or contaminated media, it has been found, according to the invention, to be expedient to use a moving sealing wall for encapsulation. The pressure difference between the encapsulated area and the environment can, therefore, be compensated for by movement of a virtually rigid wall, or by expansion of a sealing wall that is flexible or can expand, in particular, until pressure equalization is achieved between an interior of the encapsulation and the environment. The configuration avoids the ingress of dirt particles or of a corrosive medium into the bidirectional linear solenoid drive.

If the sealing wall is virtually rigid and inflexible, it can be configured to be moved, for example, parallel to the axis, and possibly to be guided, on a sliding surface. It has, then, been found to be useful to fit a sliding seal between the moving sealing wall and the sliding surface to prevent the ingress of dirt into the encapsulated area, but, at the same time, to allow the movement of the sealing wall.

If the environmental pressure rises, a correspondingly greater amount of pressure equalization must be carried out, with a correspondingly greater equalization volume.

In accordance with again another feature of the invention, there is provided a sliding seal disposed between the sealing wall and the first actuator, the second actuator, and/or the thrust body and creating a seal therebetween.

The expansion or the necessary movements of the sealing wall is or are particularly small when, according to the invention, the encapsulation (that is to say, the complete encapsulated area) is filled with a liquid medium.

In accordance with again a further feature of the invention, a high-temperature-resistant oil (up to 225° C.) is, advantageously, inserted into the encapsulation because, in addition to the pressure, it also has to withstand the high temperatures that often occur.

The permanent magnets that are used in the actuators, in particular, in the at least first actuators, are, preferably, composed of hard-magnetic material, in order to produce a hysteresis loop that is as broad as possible. AlNiCo can be used, in particular, as a hard-magnetic material.

For configurations that are used in extreme environmental conditions, in particular, in high ambient temperatures, the Curie temperature of the hard-magnetic materials that are used has values that are higher than 600° C. to avoid demagnetization or an excessively short life.

In contrast, the at least one armature ring and the yoke of the first actuators, in particular, are manufactured from soft-magnetic materials, in particular, including RNi12. These materials prevent remagnetization losses and achieve an advantageously high degree of saturation induction.

According to the invention, there are a number of possible ways to supply electrical power to the drives.

A particularly compact form for the electrical power supply is achieved by supplying existing drives with electrical power from a power supply unit.

It is feasible for the invention to provide two or more power supply units. One power supply unit then, for example, supplies the at least one first actuator, and the further power supply unit supplies the at least one second actuator for the rotary movement, and so on.

In accordance with again an added feature of the invention, every first, second or, third actuator is provided with a power supply unit that is associated solely with it. Such a configuration improves the reliability of the electrical power supply, thus reducing the failure probability.

Redundancy is also worthwhile for the power supply units. Accordingly, at least one more power supply unit is provided than is necessary for the electrical construction. If one power supply unit now fails, even temporarily, for example, as a result of overheating, a control device can switch to the redundant power supply unit. Such a configuration ensures continued operation without any interruptions.

If the aim is to achieve particularly protected operation or particularly high availability, correspondingly more power supply units are added to the configuration, for example, until every actuator is equipped with two power supply units.

In accordance with again an additional feature of the invention, the control device can coordinate all the movement sequences of the actuators and components in the configuration. An advantageous configuration of the control device is also provided when signals are generated or processed, and calculations are carried out by it.

In accordance with still another feature of the invention, the solenoid drive has a first axial face, a second axial face, and an axial extent with a first supply area disposed over an entirety of the axial extent and through which lines are to be passed from the first axial face to the second axial face.

In accordance with still a further feature of the invention, the first supply area is a recess in the solenoid drive and is shaped as a part of a hollow cylinder.

In accordance with a concomitant feature of the invention, the inner tube is guided eccentrically in the outer tube at least in an area of the solenoid drive, the solenoid drive has an external diameter, a first axial face, and a second axial face, a second supply area is provided between the external diameter of the solenoid drive and an internal diameter of the outer tube, and lines are to be passed through the second supply area from the first axial face to the second axial face.

Other features that are considered as characteristic for the invention are set forth in the appended claims.

Although the invention is illustrated and described herein as embodied in a method and configuration for driving a thrust body by a bidirectional linear solenoid drive, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIGS. 5A to 5F are diagrammatic, cross-sectional views of a mating structure of a structure element and a holding structure of a transport tube according to the invention in various steps in the method according to the invention;

DESCRIPTION OF THE PREFERRED EMBODIMENTS

Figure 1:
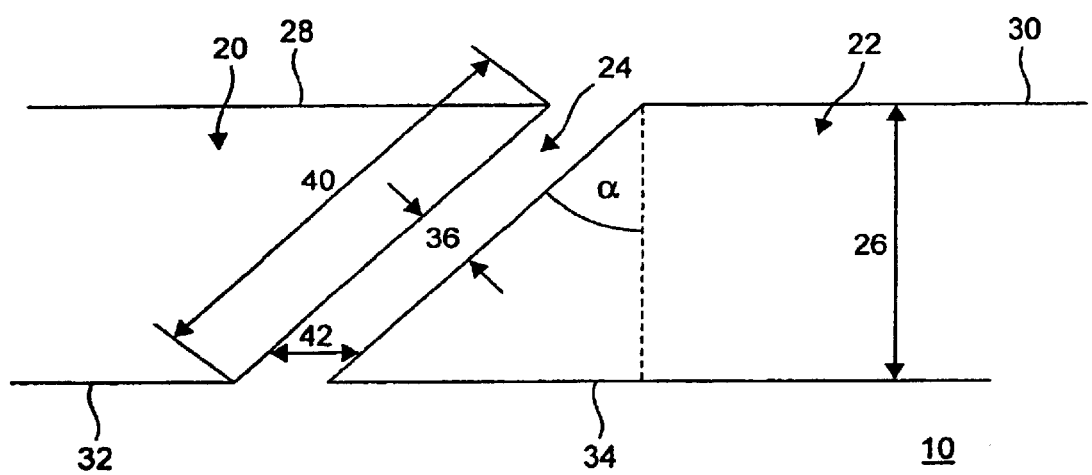
FIG. 1 is a fragmentary, cross-sectional view of an area around an air gap according to the invention.

Referring now to the figures of the drawings in detail and first, particularly to FIG. 1 thereof, there is shown a section through an area around an air gap 24 between a yoke 20 and an armature 22 in an air gap area 10 in a bidirectional solenoid drive. The armature 22 and the yoke 20 have the material thickness 26, to be precise in the direction of their extent between the correspondingly associated upper faces 28 and 30, respectively, and their lower faces 32 and 34, respectively. The flat side surfaces, which can be seen in FIG. 1 as side lines, of the yoke 20 and of the armature 22 that are opposite one another are separated by the constant distance 36 and are at an angle $\alpha$ to the perpendicular to the upper faces 28, 30. The side lines of the mutually opposite side surfaces have a length 40, which is greater by the factor of the reciprocal of the cosine of the angle a than the material thickness 26 of the yoke 20 or of the armature 22. The maximum travel 42 in the direction of the spatial position of the upper faces 28, 30 is obtained from the constant distance 36, multiplied by the factor of the reciprocal of the cosine of the angle $\alpha$, between the mutually opposite side surfaces.

FIG. 1 thus shows that position of the yoke 20 and of the armature 22 with respect to one another in which they are at the maximum distance from one another. As the maximum travel 42 increases, the magnetic force acting between the yoke 20 and the armature 22 decreases. However, the magnetic force affect can be at least partially compensated for again by suitable choice of the angle a. For maximum travels 42 of under 2 mm, the force maximum occurs at an angle $\alpha$ of 0°, or close to this value. If the maximum travel 42 is chosen to have a greater value than 2 mm, the particularly advantageous value of the angle $\alpha$ rises to 45°, and possibly to even higher values.

Figure 2:
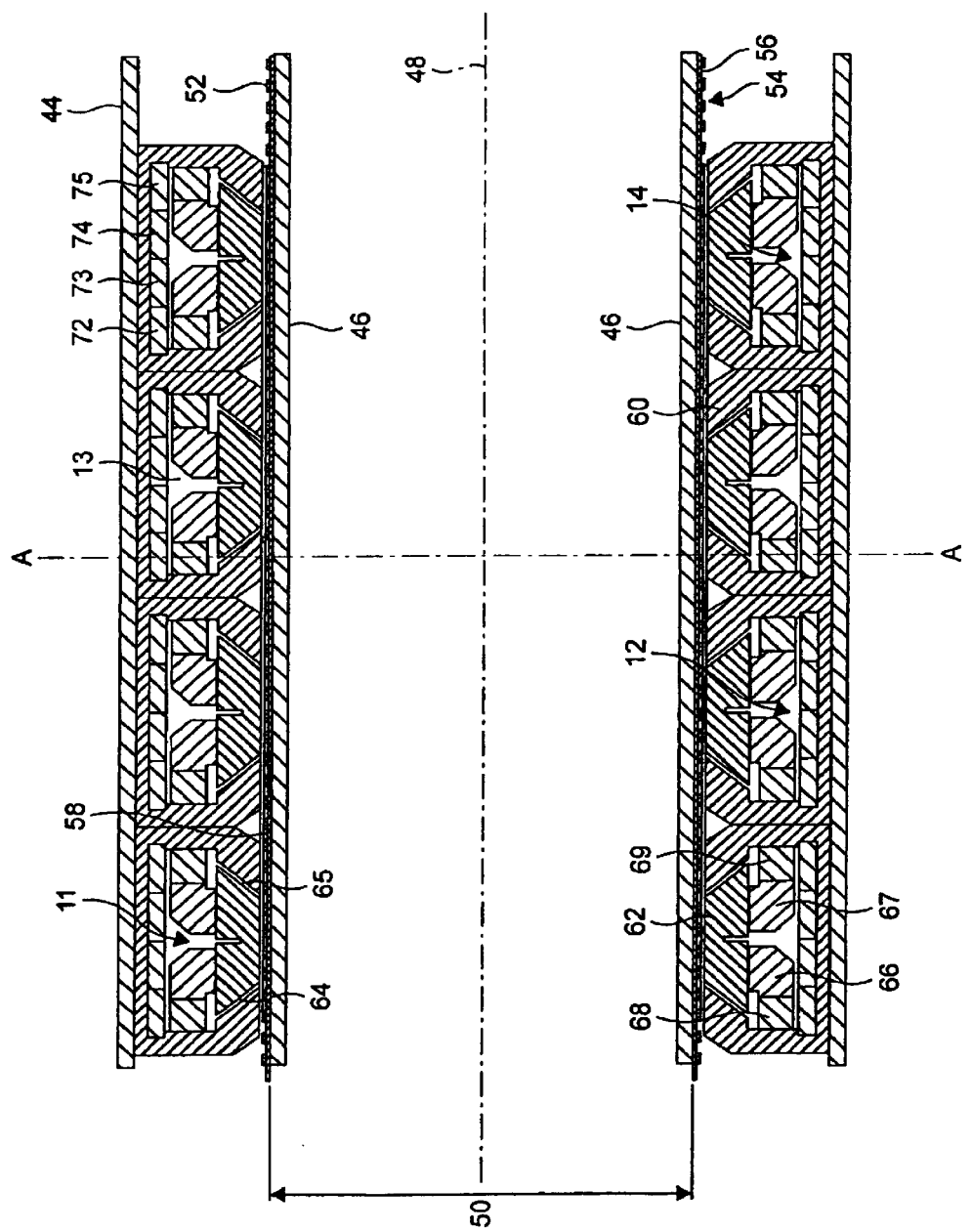
FIG. 2 is a fragmentary, cross-sectional view through a configuration of first actuators according to the invention.

FIG. 2 shows a longitudinal cross-section through four first actuators 11, 12, 13, 14 for a bidirectional solenoid drive, which are disposed in an annular space between an outer tube 44, for example, a borehole tube, and an inner tube 46, for example, a production tube.

The cross-section shows the axis of symmetry of the rotationally symmetrical configuration as a line of symmetry 48 in the longitudinal section. The inner tube 46 has an external diameter 50. The unobstructed width of a transport tube 52 is actually chosen to be somewhat larger than the external diameter 50, and its surface, which faces the inner tube 46, that is to say, the inside, is smooth so that it can move guided on and over the inner tube 46. The outside of the transport tube 52 has a holding structure 54 that has transverse grooves 56 with a rectangular profile in the radial direction, as well as longitudinal grooves in the axial direction, although these are not illustrated. In the area of the further actuators 11, 12, 13, 14, a mating structure element 58 engages in the holding structure of the transport tube 52. The section in FIG. 2 shows that the contours of the mating structure element 58 facing the transport tube are precisely matched to the holding structure 54 so that the transverse grooves 56 are completely filled with the mating structure element 58 in this area. The structure element 58 is substantially a tubular section whose surface facing the holding structure 54 is contoured as described, is smooth on its outer face, and is connected to each of the armature rings 62 of the first actuators 11, 12, 13, 14. The armature rings 62 of the first actuators 11, 12, 13, 14 are, thus, in the end connected to one another with a force fit by the mating structure element 58, and, in this way, form a common, effective, overall armature ring. As can easily be seen, instead of the overall armature ring that is formed of the armature rings 62 and with the mating structure 58, it is also possible for an overall armature ring such as this to be in the form of a single element.

All four first actuators 11, 12, 13, 14 are constructed identically and are disposed such that they rest tightly against one another, completely filling the available annular space between the outer tube 44 and the transport tube 52. The first actuators 11, 12, 13, 14 are accordingly constructed to be annular, concentric and symmetrical with respect to a line of symmetry 48.

One major element of a first actuator 11, 12, 13, 14 is a yoke ring 60 that is in the form of a hollow body, thus, in this way, forming the outer sleeve of the first actuator 11, 12, 13 or 14. To this extent, the further yoke 60 also forms the side boundary between the interior of the first actuator 11, 12, 13 or 14 and the surrounding annular space. The further yoke ring 60 is chamfered at an angle of approximately 45° towards the center of the inner face of the first actuator 11, 12, 13 or 14 on both side parts, which point in the axial direction, on the side pointing towards the transport tube 52. This chamfer starts at a distance of about a quarter of the annular space height from the internal diameter of the first actuator 11, 12, 13 or 14. The outer sleeve that is formed by the further yoke ring 60 is open at only one point, namely, on the surface facing the transport tube 52. An opening that is annular by virtue of the geometry and is bounded by the chamfered flanks of the yoke ring side areas is formed in this surface. The armature ring 62 of the first actuator 11, 12, 13 or 14 is fitted in an annular shape into this opening. There is a small gap 64, 65 between the armature ring 62 and each of the flanks of the yoke ring 60. These gaps 64, 65 allow the armature ring 62 to move in the axial direction, and the extended length between the armature ring 62 and the yoke ring 60 in the axial direction determines the maximum movement step that can be carried out by the first actuator 11, 12, 13 or 14. The armature ring 62 is symmetrical with respect to an imaginary plane of symmetry that, in the axial direction, runs precisely centrally in the respective first actuator 11, 12, 13 or 14 and is at right angles to the line of symmetry 48. On its side facing the transport tube 52, the armature ring 62 has two moldings 66, 67, which are approximately in the form of a 90° bend and are disposed such that one limb of the molding lies in the plane of symmetry and the other limb, which ends with a flat end surface, projects at right angles out of the plane of symmetry.

A permanent magnet ring 68, 69, which is virtually square in shape in the section shown in FIG. 1, is in each case located between an end surface and the respective side wall of the corresponding half of the yoke ring 60.

Four coils or solenoids 72, 73, 74, 75 that are identical are located in the cavity in the yoke ring 60 between the area having the largest diameter and the permanent magnet 68, 69 and occupy the entire available intermediate space in the cavity in the axial direction, rest internally on the face with the larger diameter on the inside of the yoke ring 60, and are at a specific distance from the boundary surface of the permanent magnet at the point where the diameter is a maximum.

Figure 3:
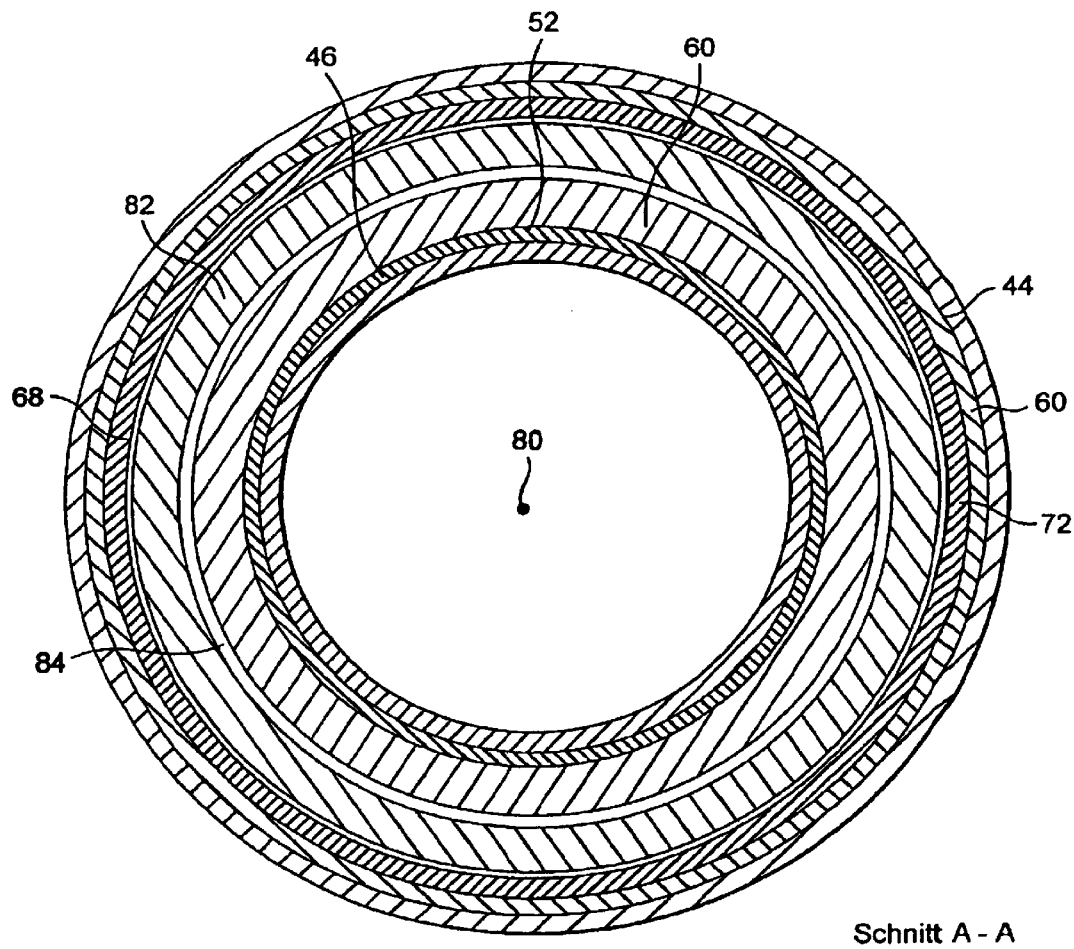
FIG. 3 is a cross-sectional view of a first actuator of FIG. 2 along section line A—A.

FIG. 3 shows a view of a section of the plane A—A through the first actuator 13. The position of the plane A—A can be seen in FIG. 2. All the illustrated components are disposed around a common center point 80, the intersection of the line of symmetry 48 with the section plane A—A. The individual components in this view can substantially be seen as annular surfaces between the inner tube 46 and the outer tube 44. The width of the individual annular surfaces is chosen to correspond to the configuration of the components shown in FIG. 2.

The section through the outer tube 44 is illustrated as the outermost, first ring. Disposed in sequence from the inside to the outside are the annular surfaces of the yoke ring 60, of the solenoid 72, of a first annular gap 82, of the permanent magnet ring 68, of a second annular gap 84, of the yoke ring 60 once again, of the transport tube 52 and of the inner tube 46.

Figure 4:
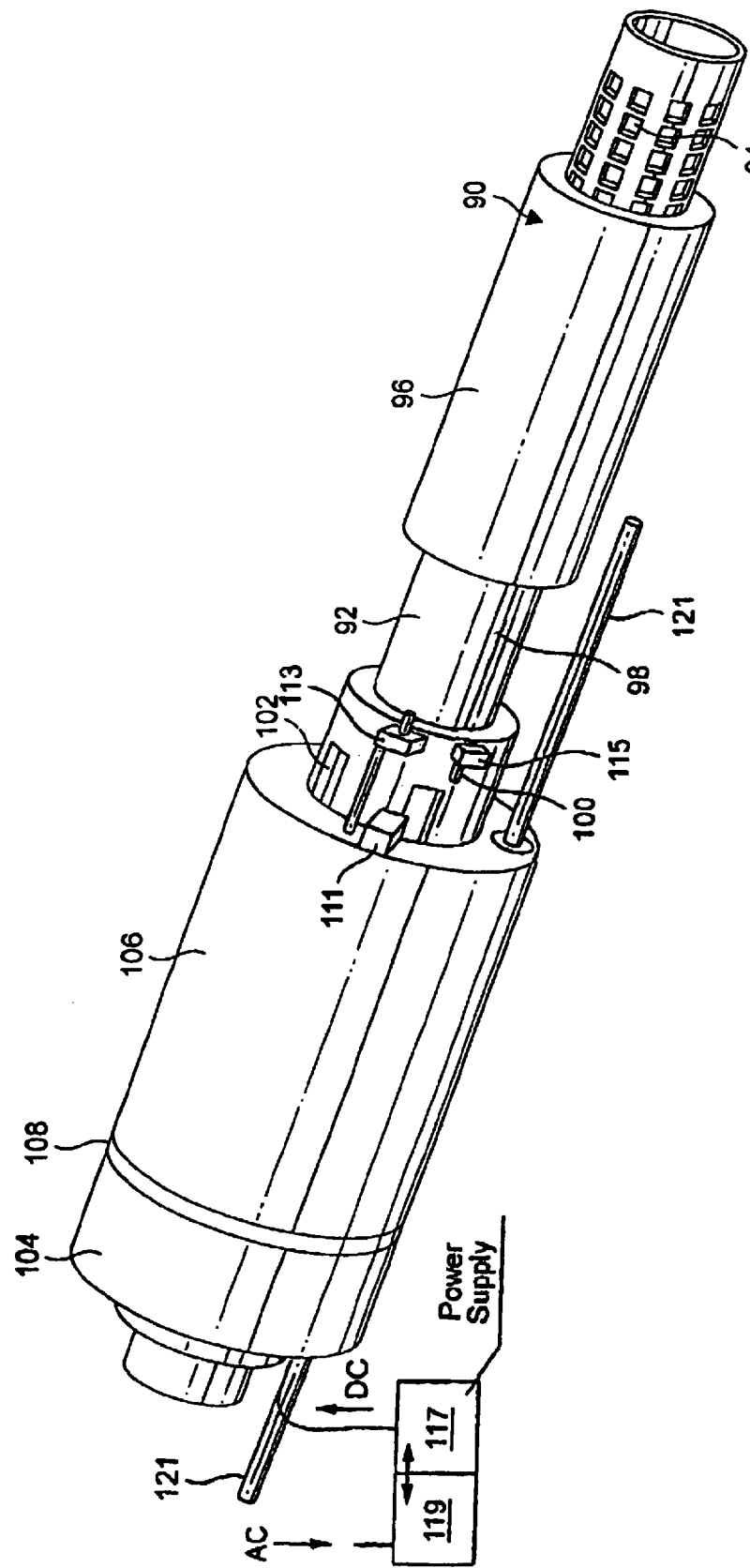
FIG. 4 is a perspective view of one refinement of a configuration according to the invention.

FIG. 4 shows a three-dimensional view of one refinement of a configuration according to the invention. This exemplary embodiment of the configuration is intended for use as an oil source and drives a restrictor valve 90 that limits the flow of oil through a production tube 92, which is illustrated only in the area of the configuration and of the restrictor valve 90. This symbolizes that the production tube 92 continues from both ends of the illustrated tube section, that is to say, on one hand, in the direction of the feed flow to the feed device for the oil source, for example, the oil platform, and, at the other end, in the direction of a further oil source. The production tube 92 is provided at its end in the direction of the oil source with square recesses 94, which are distributed over the entire circumference of the outer surface of the production tube 92. The recesses 94 are disposed in rows along the axis of symmetry of the production tube 94 and also project into the area of the restrictor valve so that some of the recesses 94 are concealed, and some of the recesses 94 are covered in the area of the end of the restrictor valve. As such, recesses 94 that are not closed allow a specific amount of oil to flow from the environment through the recesses 94 into the interior of the production tube 92.

The restrictor valve 90 substantially has a piece of tubing 96 that is disposed such that it can be moved over the production tube 92. The piece of tubing 96 has an unobstructed width that precisely fits over the production tube 92. This, on one hand, allows the piece of tubing 96 to be moved parallel to the axis, but, on the other hand, prevents oil from flowing through the recesses 94 that are covered by the piece of tubing 96. The piece of tubing 96 is chosen to be at least sufficiently long that, when the restrictor valve 90 is in the completely closed position, the piece of tubing 96 covers all of the recesses 94 and prevents any oil flow through the recesses 94.

The piece of tubing 96 is connected to a tubular thrust body 100 by two connecting elements 98, one of which is visible. Any axial movement of the thrust body 100 is transmitted mechanically through the connecting elements 98 to the piece of tubing for the restrictor valve 90. Six holding structure elements 102 are distributed uniformly over the circumference of the thrust body 100, two of which can be seen in this view. The holding structure elements 102 are fitted to the outer surface of the thrust body 100, have a width corresponding to above 20 degrees of the circumference of the thrust body 100, are parallel to the axis of symmetry of the thrust body, and start and end at a distance from the thrust body ends that corresponds approximately to twice the extent of their width.

The view of the configuration also shows a latching sleeve tube of a catch 104 as well as a sleeve tube 106 for the first actuators 11 etc., which are configured to be tubular as an outer housing, have the same external diameter, and are joined to one another by inserting a sealing element 108 between them. The same external diameters are matched in a corresponding manner to a borehole tube, which is not illustrated.

The catch 104 as well as its at least one second actuator are provided as a drive in the annular space between the latching sleeve tube and the thrust body 100, with the catch 104 being located on that side of the thrust body 100 that faces away from the restrictor valve 90. The thrust body 100 projects by an amount approximately equal to the magnitude of its external diameter longer than the sum of lengths of the catch sleeve tube and sleeve tube 106 and is disposed approximately centrally around the catch 104 and the first actuators of the bidirectional linear solenoid drive so that the thrust body 100 overhangs the two end surfaces of the overall body including the catch 104 and the first actuators.

A power supply 117 can supply electrical power to the thrust body 100 and a control device 119 can control at least the power supply 117. It is noted that the sleeve tube 106 can have an encapsulation protecting it against environmental conditions. 45. The solenoid drive has an axial extent with a first supply area disposed over an entirety of the axial extent and through which lines 121 are to be passed from the first axial face to the second axial face. The inner tube can be guided eccentrically in the outer tube at least in an area of the solenoid drive. A second supply area can provided between an external diameter of the solenoid drive and an internal diameter of the outer tube and the lines 121 are to be passed through the second supply area from the first axial face to the second axial face.

FIGS. 5A to 5F, which now follow, show sketches that correspond to various steps in the method according to the invention. In a simplified illustration, they show in a planar development the section through the mating structure of the structure element 58 and through the holding structure 54 of the transport tube 52. Crossing axes are shown on the sketches, for illustrative purposes. These Cartesian coordinate axes are aligned such that a vector to the right points in the x-axis direction, corresponding to the radial direction, and a vector upwards points in the y-axis direction, corresponding to the axial direction.

In all of the sketches, the transport tube 52 has first recesses 110 in the x-axis direction and second recesses 112 in the y-axis direction on its outer surface. The webs 114 that are formed by the first and second recesses 110, 112 together produce the holding structure 54. The second recesses 112 are disposed parallel to the center axis of the transport tube 52 and have the first width 116. The second width 118, which is governed by the second recesses 112, is subdivided uniformly by the first recesses 110 so that webs 114 have a shape in the form of ribs, with the first recesses 110 having a fifth width 130 between two adjacent webs 114, with this fifth width 130 being slightly greater than the web thickness 122 of the webs 114. A rib-like web 114 with web thickness 122 could, thus, just be moved in the x-direction into a first recess 110 whose width is 130.

The example of FIGS. 5A to 5F shows two, and only two, web rows, each having eight such rib-like webs 114. Each of the rib-like webs 114 has rounded edges, in this view the corners of the webs 114. The first width 116 of the second recesses 112 is slightly greater than the second width 118 of the webs 114. An object with the second width 118 can, thus, just move in the y-direction in a second recess 112.

The structure element 58 of the armature ring 62 is configured to be identical to its mating structure, with the same dimensions as the elements of the holding structure 54 of the transport tube 52, and with two longitudinal grooves 124, 125 having the fourth width 126 in the y-direction, which fourth width 126 corresponds to the first width 116, and with the structure element webs 128 having the fifth width 130, corresponding to the second width 118, and with the structure element webs 128 having the structure element web thickness 132 corresponding to the web thickness 122, and with a transverse groove 136 having a sixth width 134 that, in a corresponding manner, is the same as the third width 120. Each web row represents eight webs 114 and structure element webs 128. In order to make it easier to distinguish between the webs 114 and the structure element webs 128, the section surfaces of the structure element webs 128 are illustrated in a homogeneously dark form.

FIG. 5A represents an initial position to describe the method of the present invention. The illustration of the structure element 58 starts at the origin of the coordinate system, such that a row of structure element webs 128 with their respective left-hand boundaries touches the y-axis, and the lowermost of the structure element webs 128 with its lower boundary just touches the x-axis, with the longer faces of the structure element webs 128 being parallel to the x-axis.

That row of webs 114 that is closer to the y-axis is disposed centrally in the longitudinal groove 124 between the two rows of structure element webs 128. The webs 114 and the structure element 128 are offset with respect to one another in the y-direction such that the structure element webs 128 are precisely at the same level as the first recesses 110. Those two webs 114 that are closest to the x-axis start with an offset precisely equal to the distance of a third width 120 from the x-axis in the positive y-direction.

According to the invention, the armature ring and, thus, the mating structure are rotated through a specific angle, for example, through 5°, about its axis. This direction will be regarded as the positive rotation direction. In the illustrated development view, this rotation corresponds to a shift of the mating structure of the armature ring through a specific amount in the positive x-axis direction, that is to say, the radial direction.

FIG. 5B shows the result of the described movement, which is illustrated as a first movement arrow 138. The structure element webs 128 are completely engaged between the webs 114, that is to say, in each case in one, and in only one, of the first recesses 110. Only those two structure element webs 128 that are closest to the x-axis are not adjacent to any web 114 on their side that faces the x-axis. The configuration according to the invention results in a type of tooth system, in which, in this position, the structure element 58 and the holding structure 54 engage in one another such that axial forces, that is to say, forces that act in the y-axis direction, are transmitted from the structure element 58 to the holding structure, or vice-versa. The longitudinal grooves 124, 125 are completely free of webs 114.

The structure element 58 is now moved in accordance with the method according to the invention by the bidirectional linear solenoid drive through a movement step in the y-axis direction. Thus, in consequence, the thrust body, the transport tube 52 in the example here, is also moved in the direction of the y-axis.

FIG. 5C shows the position of the structure element 58 and holding structure 54 after this movement step, which is illustrated as a second movement arrow 140. The structure element 58 has been moved by the sum of the third width 120 and of the web thickness 122. The holding structure 54, which is engaged with the structure element 58, has, accordingly, likewise been moved through the same distance. The distance between the x-axis and the lowermost of the webs 114 has, thus, also been increased in a corresponding manner.

According to the method, the axial position reached by the holding structure 54 is now secured by at least one catch, which may also be understood as meaning a blocking apparatus, a bolt, or a similar apparatus that in any case prevents, the position being left in the y-direction, once it has been reached, and that is, thus, connected to the holding structure 54 or to the thrust body, that is to say, in the chosen example to the transport tube 52, such that the forces that would reset the holding structure 54 to the initial position are passed on to the catch. The catch can, for example, pass on these forces that have been introduced to the outer tube 44 and/or to the inner tube 46 and can, thus, so to speak, be supported there. The catch or blocking apparatus is, however, not shown in this figure.

The holding structure 54, thus, dissipates any restoring forces that may be present through the catch, and cannot be moved back to the previous position.

In the method step that now follows, the structure element 58 is rotated back through the specific angle, that is to say, for example, through 5°, in the negative rotation direction.

FIG. 5D shows the position of the webs 114 and of the structure element webs 128 after being rotated back in this way, as is illustrated by the third movement arrow 142. The mating structure is moved back precisely to its initial position in the direction of the x-axis, that is to say, the outermost left-hand edges of the structure element webs 128 in the left-hand row just touch the y-axis. The position of the structure element webs 128 in the y-direction is as shown in FIG. 5C.

Overall, the structure element 58 is, once again, located in the longitudinal grooves in the holding structure 54 and is, thus, free to move in the direction of the longitudinal groove, that is to say, in the y-direction.

The position of the holding structure 54 is unchanged, as is described in FIG. 5C.

Because the structure element 58 and the holding structure 54 have now released their engagement in one another again, the structure element is moved downwards by the armature ring of the bidirectional linear solenoid drive in the longitudinal grooves of the holding structure 54, that is to say, in the negative y-direction, until its original position as shown in FIG. 5-A is reached.

FIG. 5E shows the position of the structure element 58 and of the holding structure 54, with the method step that has just been described being indicated by a fourth movement arrow 144. The structure element 58 is in its original position, as described in FIG. 5A, and is, thus, once again in the position in which the method can start once again with its first method step. In comparison to the position described in FIG. 5A, the holding structure 54 has been shifted by a distance precisely equal to the web thickness 122 plus a third width 120 in the positive y-axis direction in comparison to its original position as shown in FIG. 5A. This amount corresponds precisely to the length of a movement step of the bidirectional linear solenoid drive. The structure element webs 128 and the webs 114 are, accordingly, once again offset with respect to one another such that the webs 114 are located precisely at the same level as the transverse grooves 136.

According to the invention, the rotary movement through the specific angle can, now, once again take place. In accordance with the method, the structure element 58 rotates into the holding structure 54. Both structures are, thus, once again engaged with one another.

FIG. 5F indicates the position of the structure element 58 and of the holding structure 54 after the movement step that has just been described, and that is indicated by a fifth movement arrow 146. The sketch is, thus, substantially the same as that in FIG. 5B, but with the difference that the holding structure 54 is offset upwards, in the y-axis direction, by the length of one movement step.

When all of the process steps in the method are carried out, the holding structure 54 and, thus, the thrust body is moved forwards by precisely one movement step in the y-axis direction, until, for example, a predetermined number of cycles of the method have been carried out and the thrust body has, thus, been shifted by precisely the length that corresponds to the distance covered by the specific number of movement steps. For example, a step counter 111 counts each cycle of the method and ends the forward movement once a predetermined number of steps or cycles has been reached. The step counter 111 detects real rotating movements, e.g., optically or mechanically. Also, a linear movement sensor 113 can be provided to measure the thrust body and indicate a position of the thrust body from the measurement. A limit switch 115 can be operatively connected to the thrust body. The step counter 111, the linear movement sensor 113, and/or the limit switch 115 produces a signal from which axial movement of the thrust body ends.

Figure 6:
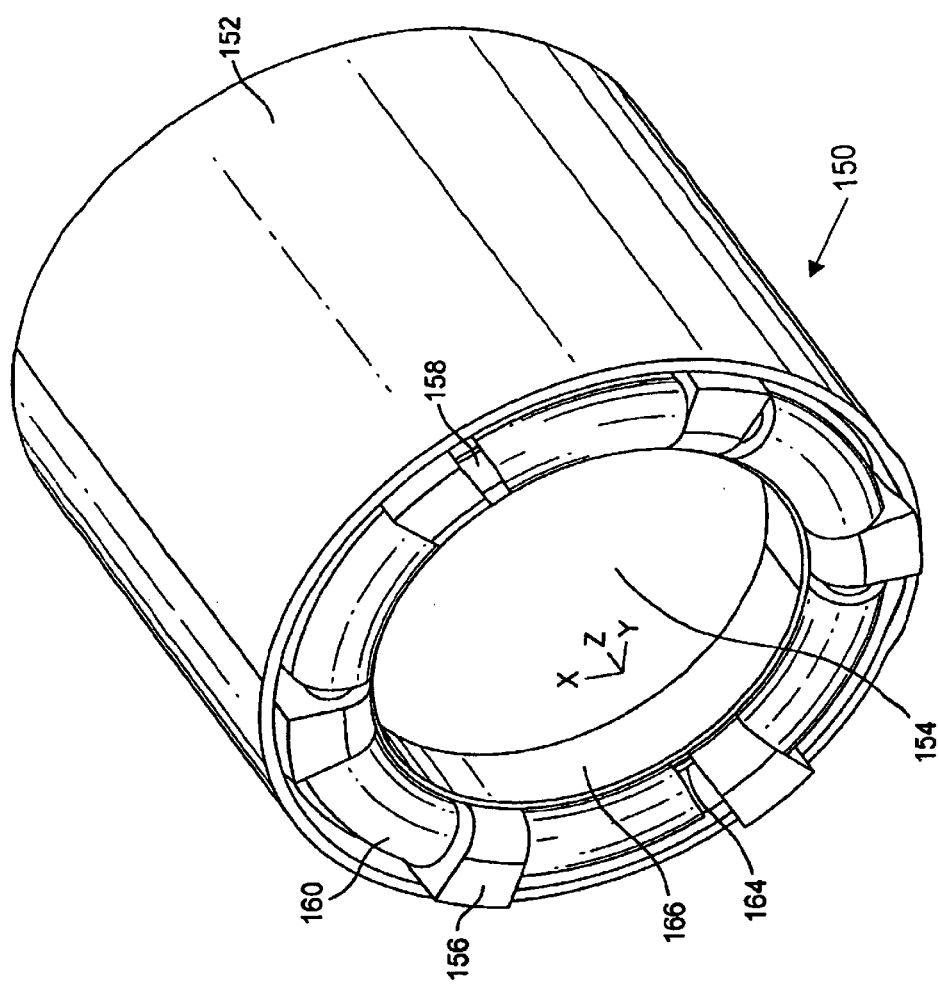
FIG. 6 is a fragmentary, perspective view of a solenoid drive for a latching element according to the invention.

FIG. 6 shows a three-dimensional view of a second actuator of a latching element 150, obliquely into a circular tube section end 154 of an outer tube section 152, with the latter bounding the latching element 150 in its radial extent as a sheath. Six supporting elements 156 of-an external support are distributed uniformly over the circumference of the tube section end 150 at the visible tube section end 154. These supporting elements 156 have a width of approximately 20° of the circular arc, and their external radius is bounded by the unobstructed diameter of the outer tube section 152 and they are located at about half of their length, that is to say, their extent in the axial direction of the outer tube section 152, within the outer tube section 152. The other half projects beyond the imaginary end surface of the outer tube section 152. Recesses are fitted approximately centrally in the side parts of the supporting elements 156, and are disposed such that an annular magnet core 158 passes through each of the recesses so that the supporting elements 156 are distributed uniformly on the magnet core 158. A solenoid 160 that is in the form of a tubular arc is disposed in the space between in each case two adjacent supporting elements 156 on the sub-area that is provided there of the magnet core 158 and, in this view, its left-hand side touches the right-hand side of the adjacent supporting element 156 and extends up to a distance of approximately 5° of the circular arc on the left-hand one of the adjacent supporting elements. The coils that together with the magnet core 158 form a magnetic drive can move with the supporting elements 156 that are located on the magnetic core 158 through precisely these 5°.

The supporting elements 156, furthermore, each have an outer supporting surface 162, which is planar, starts on the outer radial area of the supporting element 156, and is disposed on the side facing away from the outer tube section 152. An inner supporting surface 164, which is planar and makes contact with the end surface of a nut 166, is in each case disposed on that side of the supporting elements 156 that faces the outer tube section 152, in order to, in fact, be located in the interior of the outer tube section 152 as a result of its position. The nut 166 has an internal thread that has longitudinal grooves that run parallel to the axial direction of the outer tube section 152, thus making it possible to screw in a thrust body there or, else, to use this latching element 150 for carrying out the method according to the invention.

Figure 7:
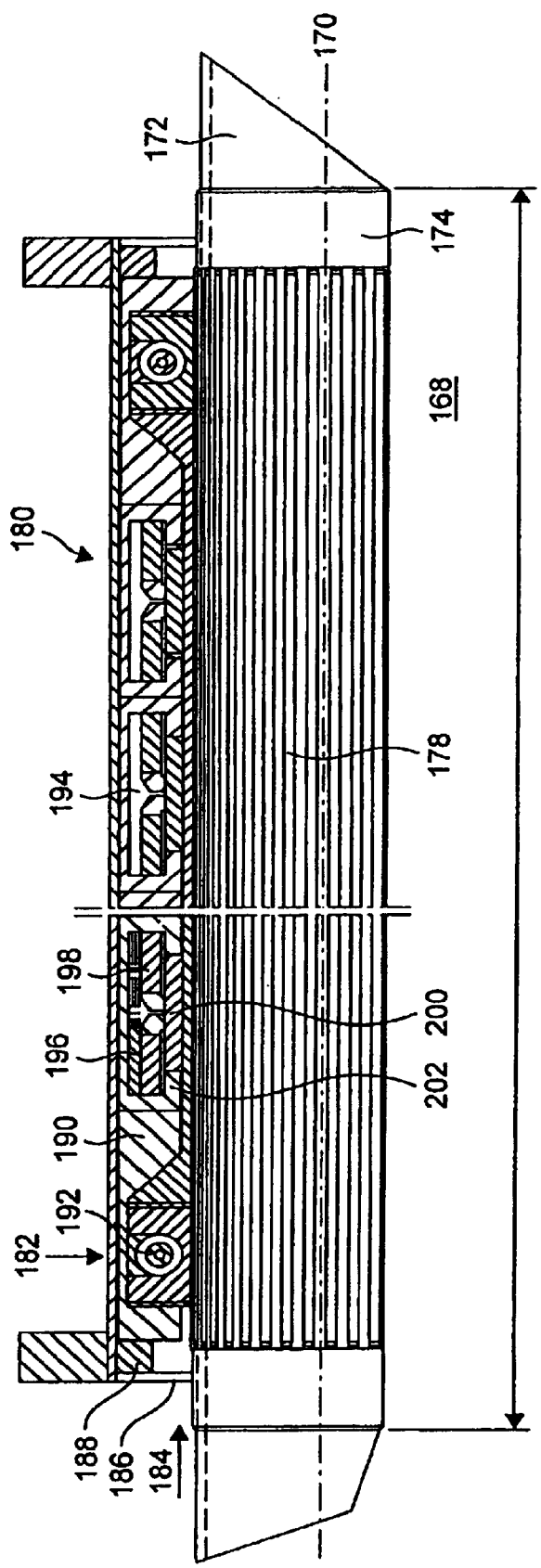
FIG. 7 is a fragmentary, cross-sectional view through an exemplary embodiment of a configuration according to the invention.

FIG. 7 shows the view of a longitudinal section through an example of a configuration 168 of a bidirectional solenoid drive according to the invention. This view shows a line of symmetry 170, which subdivides this view into two halves, one half of which is shown completely. Starting from the line of symmetry 170, a threaded tube 174 with a first length 176 is disposed around a tube 172. Starting at a distance of about half the radius of the threaded tube 174 from its edges, the threaded tube 174 has a surface structure 178 that has recesses that run in the direction parallel to the line of symmetry 170 and are illustrated, as well as recesses that are in the form of threads, but are not illustrated for the sake of clarity.

A drive 180 according to the invention is disposed around the threaded tube 174, substantially being disposed in the form of a circumferential annular space between a tubular, outer housing 182 and the threaded tube 174. The drive 180 is configured to be symmetrical, when seen from the end surfaces of the outer housing 182. When seen from the end surface 184, the annular gap between the outer housing 182 and the threaded tube 174 is virtually completely closed by an annular cover 186. A supporting ring 188 is disposed at the contact point between the cover 186 and the outer housing 182.

The symmetrically disposed second support ring on the other side of symmetry of the drive 180 is in the form of a clamping ring, to clamp together the components that are located between the two supporting rings.

A connecting element 190 is disposed such that it touches the supporting ring 188 and, in this view, is substantially U-shaped, with the open side facing the threaded tube 174. A blocking element 192 is disposed on the inner face of that limb of the connecting element that faces the supporting ring and acts as a catch for one movement direction of the threaded tube 174, for example, as a non-return stop. The symmetrical second blocking element is provided as a catch for the opposite movement direction of the tube 174 accordingly as a block against forward movement in this example.

The construction of the blocking element 192 and of the second blocking element substantially corresponds to the solenoid 160 on the magnet core 158 shown in FIG. 6.

An actuator component 194 is adjacent to the outside of that limb of the connecting element 190 that faces away from the supporting ring 188. Based on knowledge of the fundamental configuration of the actuator 11 as shown in FIG. 2, its individual elements can be seen in functional terms once again in the actuator component 194. A coil or solenoid element 196 corresponds to one of the solenoids 72 to 75, a permanent magnet element 198 corresponds to a permanent magnet ring 68 or 69, an armature element 200 corresponds to the armature ring 62, and a yoke element 202 corresponds to the yoke ring 60.

We claim:

1. A method for driving a thrust body, which comprises:
    providing a bidirectional linear solenoid drive with at least one first actuator and at least one second actuator;
    providing the at least one first actuator with at least one solenoid and a yoke;
    interacting the at least one first actuator with at least one armature ring;
    alternately applying force to the thrust body by:
        shifting the thrust body axially with the at least one armature ring;
        acting the at least one second actuator on the at least one armature ring to rotate the at least one armature ring; and
        subsequently fixing the at least one armature ring in position; and
    shifting the thrust body in steps until the thrust body has reached a respective final position.

2. The method according to claim 1, which further comprises interacting one of the armature ring and the second actuator with a latching apparatus to fix the thrust body in position by the latching apparatus at least when the armature ring is not acting on the thrust body.

3. The method according to claim 2, which further comprises carrying out at least one rotary movement with the latching apparatus to fix the thrust body in position at times.

4. The method according to claim 2, which further comprises moving the latching apparatus with at least one third actuator.

5. The method according to claim 1, which further comprises interlockingly acting on the thrust body with the first actuator.

6. The method according to claim 1, which further comprises:
    interacting the armature ring with the thrust body to rotate the armature ring in one rotation direction about a longitudinal axis of the armature ring; and
    causing a latching with the latching apparatus that respectively fixes the thrust body in position until the first actuator once again acts on the thrust body.

7. The method according to claim 1, which further comprises:
    interacting the armature ring with the thrust body to alternately rotate the armature ring in rotation directions about a longitudinal axis of the armature ring; and
    causing a latching with the latching apparatus that respectively fixes the thrust body in position until the first actuator once again acts on the thrust body.

8. The method according to claim 1, which further comprises
    ending a step movement of the thrust body one of:
        when a specific number of movement steps is reached; and
        when a signal results in switching off the step movement.

9. The method according to claim 1, which further comprises providing a control device for coordinating the shifting of the thrust body.

10. A driving configuration, comprising:
    a thrust body;
    a bidirectional linear solenoid drive for driving said thrust body according to the method of claim 1, said solenoid drive having at least one first actuator and at least one second actuator, said first actuator having at least one yoke, at least one solenoid, and at least one armature ring, said first actuator configured to substantially axially move the thrust body;
    said yoke and said armature ring being separated at a distance from one another to define therebetween an active air gap;
    said armature ring configured to operatively interact with said thrust body;
    said second actuator operatively connected to said armature ring to rotate said armature ring; and
    a latching apparatus configured to fix said thrust body at times.

11. A driving configuration, comprising:
    a thrust body;
    a bidirectional linear solenoid drive for driving said thrust body in steps until said thrust body has reached a respective final position, said solenoid drive having at least one first actuator and at least one second actuator;
    said first actuator having at least one yoke, at least one solenoid, and at least one armature ring, said first actuator configured to substantially axially move said thrust body;
    said yoke and said armature ring being separated at a distance from one another to define therebetween an active air gap;
    said armature ring configured to operatively interact with said thrust body and, thereby, apply force alternately to said thrust body;
    said second actuator operatively connected to said armature ring to rotate said armature ring and, thereby, axially shift said thrust body and subsequently fix said thrust body in position; and
    a latching apparatus configured to fix said thrust body at times.

12. The configuration according to claim 9, wherein:
    said first actuator has at least two permanent magnets; and
    said permanent magnets magnetically act upon said armature ring to magnetically clamp the armature ring in an unstable manner.

13. The configuration according to claim 11, wherein:
said armature ring has a longitudinal axis;
said thrust body has a surface with a holding structure at least at positions in an area of said surface facing said armature ring; and
said armature ring has a mating structure compatible with said holding structure disposed on said surface facing said thrust body and is inserted into said holding structure during rotation of said armature ring about said longitudinal axis.

14. The configuration according to claim 11, wherein the thrust body has an outline having a shape selected from the group consisting of a cylinder, a plunger, an annulus, and a tube.

15. The configuration according to claim 13, wherein:
said holding structure has:
first recesses in a direction parallel to an axis of said thrust body; and
second recesses in a radial direction of said thrust body;
said first recesses permit corresponding movements on said armature ring; and
said second recesses permit corresponding rotary movement of said armature ring.

16. The configuration according to claim 13, wherein said holding structure has substantially helical recesses and said substantially helical recesses permit a combined axial/radial movement of said armature ring.

17. The configuration according to claim 15, wherein at least one of said first and second recesses are selected from the group consisting of grooves, slots, and threads.

18. The configuration according to claim 16, wherein said substantially helical recesses are selected from the group consisting of grooves, slots, and threads.

19. The configuration according to claim 13, wherein at least said holding structure is of stainless steel.

20. The configuration according to claim 15, wherein:
said recesses are one of radially and helically provided on said thrust body; and
said mating structure is matched to said holding structure to engage in said recesses in said holding structure by a substantially radial movement of one of the group consisting of said mating structure and said holding structure.

21. The configuration according to claim 13, wherein said mating structure configured with one of recesses and grooves running parallel to said longitudinal axis to allow said mating structure to move substantially parallel to said thrust body axis in said holding structure.

22. The configuration according to claim 13, wherein said mating structure is one of firmly connected to said armature ring and integrally formed on said armature ring.

23. The configuration according to claim 13, wherein said mating structure is of stainless steel.

24. The configuration according to claim 13, wherein said mating structure is one of a machined nut and a reversing nut.

25. The configuration according to claim 13, wherein said holding structure and said mating structure are provided radially between said armature ring and said thrust body.

26. The configuration according to claim 13, wherein said holding structure and said mating structure are at least partially provided away from a section of said longitudinal axis of said armature ring.

27. The configuration according to claim 13, wherein:
said solenoid drive has a longitudinal axis;
said longitudinal axis has a section in which said armature ring is disposed; and
said holding structure and said mating structure are at least partially provided away from said section of said longitudinal axis.

28. The configuration according to claim 13, wherein said first actuator is at least two first actuators each having an armature ring and being disposed to one of jointly transmit forces to said thrust body and absorb forces from said thrust body.

29. The configuration according to claim 13, wherein said solenoid drive, said second actuator, said thrust body, and said latching apparatus are to be disposed in an annular space between an outer tube and an inner tube.

30. The configuration according to claim 13, wherein said latching apparatus is coupled to said armature ring and one of:
follows rotary movements of said armature ring in a corresponding manner; and
utilizes rotary movement of said armature ring as a drive.

31. The configuration according to claim 13, wherein said latching apparatus is coupled to said second actuator and one of:
follows rotary movements of said second actuator in a corresponding manner; and
utilizes rotary movement of said second actuator as a drive.

32. The configuration according to claim 13, wherein said latching apparatus has at least one third actuator as a drive.

33. The configuration according to claim 13, further comprising at least one step counter measuring individual forward and backward steps of said thrust body and indicating a position of said thrust body from the measurement.

34. The configuration according to claim 13, further comprising a linear movement sensor measuring said thrust body and indicating a position of said thrust body from the measurement.

35. The configuration according to claim 31, further comprising:
a limit switch operatively connected to said thrust body;
a linear movement sensor measuring said thrust body and indicating a position of said thrust body from the measurement; and
at least one of said step counter, said linear movement sensor, and said limit switch producing a signal from which axial movement of said thrust body ends.

36. The configuration according to claim 13, further comprising at least one power supply unit for supplying electrical power to at least one electrical load.

37. The configuration according to claim 13, wherein said first actuator has an encapsulation protecting said first actuator against environmental conditions.

38. The configuration according to claim 37, wherein said encapsulation has a moving sealing wall being one of:
approximately rigid and able to one of move and slide along a guide; and
one of flexible and expandable until pressure equalization is achieved between an interior of said encapsulation and the environment.

39. The configuration according to claim 38, further comprising a sliding seal disposed between said sealing wall and one of the group consisting of said first actuator, said second actuator, and said thrust body and creating a seal therebetween.

40. The configuration according to claim 37, wherein said encapsulation defines a space therewithin and said space is filled with a liquid medium.

41. The configuration according to claim 40, wherein said liquid medium is high-temperature resistant oil.

42. The configuration according to claim 13, wherein:

said armature ring has a longitudinal axis;

said thrust body has a surface with a holding structure at least at positions in an area of said surface facing said armature ring;

said armature ring has a mating structure compatible with said holding structure disposed on said surface facing said thrust body and is inserted into said holding structure during rotation of said armature ring about said longitudinal axis; and said permanent magnets are a hard-magnetic material of AlNiCo.

43. The configuration according to claim 42, wherein said hard-magnetic material has Curie temperatures of at least 600° C.

44. The configuration according to claim 13, wherein said armature ring and said yoke is a soft-magnetic material of RNi12.

45. The configuration according to claim 13, further comprising a control device operatively connected to at least one of said solenoid drive and said latching apparatus for coordinating shifting of said thrust body.

46. The configuration according to claim 13, wherein said solenoid drive has:

a first axial face;

a second axial face; and an axial extent with a first supply area disposed over an entirety of said axial extent and through which lines are to be passed from said first axial face to said second axial face.

47. The configuration according to claim 46, wherein said first supply area is a recess in said solenoid drive and is shaped as a part of a hollow cylinder.

48. The configuration according to claim 29, wherein:

the inner tube is guided eccentrically in the outer tube at least in an area of said solenoid drive;

said solenoid drive has an external diameter, a first axial face, and a second axial face;

a second supply area is provided between said external diameter of said solenoid drive and an internal diameter of the outer tube; and lines are to be passed through said second supply area from said first axial face to said second axial face.

* * * * *